United States Patent
Faye et al.

(10) Patent No.: US 6,873,897 B2
(45) Date of Patent: Mar. 29, 2005

(54) METHOD AND DEVICE FOR STABILIZING A VEHICLE

(75) Inventors: Ian Faye, Stuttgart (DE); Klaus-Dieter Leimbach, Eschach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/451,574

(22) PCT Filed: Nov. 23, 2001

(86) PCT No.: PCT/DE01/04414

§ 371 (c)(1),
(2), (4) Date: Dec. 8, 2003

(87) PCT Pub. No.: WO02/051680

PCT Pub. Date: Jul. 4, 2002

(65) Prior Publication Data

US 2004/0078131 A1 Apr. 22, 2004

(30) Foreign Application Priority Data

Dec. 23, 2000 (DE) .......................... 100 65 010

(51) Int. Cl.⁷ .............................................. G06F 19/00
(52) U.S. Cl. ........................... 701/70; 701/45; 180/271; 340/440; 267/64.16
(58) Field of Search ........................... 280/5.502, 86.75, 280/6.16, 735, 91; 267/64.27, 64.28, 64.16, 64.24; 188/322.19; 701/45, 37, 70, 36; 180/271, 282, 735, 140, 142, 443, 446; 340/429, 440, 436, 689, 438, 439, 471

(56) References Cited

U.S. PATENT DOCUMENTS

| | | | | |
|---|---|---|---|---|
| 4,598,788 A | * | 7/1986 | Serizawa et al. ........... | 180/412 |
| 5,471,388 A | * | 11/1995 | Zomotor et al. .............. | 701/36 |
| 5,566,929 A | * | 10/1996 | Thurow .................... | 267/64.24 |
| 5,669,418 A | * | 9/1997 | Wode ......................... | 137/859 |
| 5,859,774 A | * | 1/1999 | Kuzuya et al. ............... | 700/71 |
| 6,038,495 A | * | 3/2000 | Schiffmann ..................... | 701/1 |
| 6,102,378 A | * | 8/2000 | Gieseler et al. .............. | 267/34 |
| 6,192,305 B1 | * | 2/2001 | Schiffmann .................. | 701/45 |
| 6,223,114 B1 | * | 4/2001 | Boros et al. .................. | 701/70 |
| 6,282,474 B1 | * | 8/2001 | Chou et al. ................... | 701/45 |
| 6,427,102 B1 | * | 7/2002 | Ding .......................... | 701/34 |
| 6,438,463 B1 | * | 8/2002 | Tobaru et al. ................. | 701/1 |
| 2003/0191572 A1 | * | 10/2003 | Roll et al. .................... | 701/70 |

FOREIGN PATENT DOCUMENTS

| | | |
|---|---|---|
| DE | 198 12 237 | 9/1999 |
| DE | 199 36 423 | 2/2000 |
| EP | 1 046 571 | 10/2000 |

* cited by examiner

Primary Examiner—Thomas G. Black
Assistant Examiner—Tuan C To
(74) Attorney, Agent, or Firm—Kenyon & Kenyon

(57) ABSTRACT

A method of stabilizing a vehicle involving the following steps is described: recording characteristic actual values that describe the driving condition of a vehicle; determining setpoint values that are at least partially assigned to the actual values; comparing actual values and setpoint values and influencing actual values based on comparison results, one of the recorded actual values being characteristic of the roll state of the vehicle, and one of the setpoint values being assigned to the recorded actual value that is characteristic of the roll state of the vehicle. A device for stabilizing a vehicle is also described.

14 Claims, 1 Drawing Sheet

METHOD AND DEVICE FOR STABILIZING A VEHICLE

The present invention relates to a method of stabilizing a vehicle including the steps: recording characteristic actual values that describe the driving condition of a vehicle, determining setpoint values that are at least partially assigned to the actual values, comparing actual values and setpoint values and influencing actual values based on comparison results. The present invention also relates to a device for stabilizing a vehicle having means for recording characteristic values that describe the driving condition of a vehicle, means for determining setpoint values that are at least partially assigned to the actual values, means for comparing actual values and setpoint values and means for influencing actual values based on comparison results.

BACKGROUND INFORMATION

Methods and devices according to the definition of the species are used in systems intended to increase driving safety based on vehicle dynamics. For example, the electronic stability program (ESP) gives the driver of a vehicle both improved basic functions with respect to the anti-lock brake system (ABS) and the anti-slip control (ASC), both systems acting primarily in situations critical to longitudinal dynamics. Examples of this include full braking and severe accelerations. The electronic stability program (ESP) also supports the driver in situations critical to transverse dynamics. The system improves driving stability in all operating states, i.e., in full braking, partial braking, free rolling, traction, thrust and load reversal as soon as an extreme driving situation occurs. Even in extreme steering maneuvers, the electronic stability program (ESP) drastically reduces the danger of swerving and largely makes it possible to keep the automobile under safe control even in critical traffic situations.

To regulate vehicle dynamics, it is known to use the float angle of the vehicle and the yaw rate of the vehicle as controlled variables. The consideration of these controlled variables makes it possible to largely eliminate the danger of swerving.

However, in addition to the danger of swerving, there also exists the danger that a vehicle will roll over due to extreme driving maneuvers. This applies all the more considering that more and more passenger cars are being offered that have a comparatively short wheelbase and a high center of gravity. The problem of the danger of rollover exists in commercial vehicles in any case.

ADVANTAGES OF THE INVENTION

The invention builds on the method of the definition of the species in that one of the recorded actual values is characteristic of the roll state of the vehicle and one of the setpoint values is assigned to the recorded actual value that is characteristic of the roll state of the vehicle. In this manner, the roll state of the vehicle is also taken into consideration as part of a known vehicle dynamics control, thus making it possible to prevent a rollover of a vehicle even having a high center of gravity and a short wheelbase and under extreme driving maneuvers.

Preferably, one of the recorded actual values is the yaw rate and one of the setpoint values is assigned to the yaw rate. It is thus advantageously possible to combine the regulation of the roll state according to the present invention with the regulation of the yaw rate already known as part of the electronic stability program (ESP).

It is also advantageous if one of the recorded actual values is the float angle and if one of the setpoint values is assigned to the float angle. It is thus possible to combine the regulation of the roll state according to the present invention with the regulation of the float angle, the latter being known from the electronic stability program (ESP). It is advantageous in particular if the yaw rate regulation, float angle regulation and the regulation of the roll state are integrated in one system.

It is advantageous that the roll angle is the actual value that is characteristic of the roll state of the vehicle. It is thus possible to measure the roll angle directly and to record the roll state of the vehicle in this manner.

However, it may also be useful if a pressure change in an air spring of the vehicle is the value that is characteristic of the roll state of the vehicle. Commercial vehicles in particular are frequently equipped with air springs so that it is advantageously possible to use the pressure change for recording the roll state.

Preferably, setpoint values are determined from the input values of vehicle speed and steering angle. The input values of vehicle speed and steering angle are also already used in the known electronic stability program (ESP) so that it is also of particular advantage to use these values as input values in the context of the present invention to determine the setpoint value that is characteristic of the roll state of the vehicle.

Preferably, actual values are influenced by braking interventions and/or engine interventions. This is also already known in the electronic stability program (ESP), for example, for the yaw rate. It is also possible to influence the actual value that is characteristic of the roll state of the vehicle in an advantageous manner by braking interventions and/or engine interventions.

Preferably the roll angle is influenced by an actuator. This influencing may occur in addition to or as an alternative to the influencing of the braking system and/or the engine so that numerous measures based on the present invention are available with respect to a rollover prevention.

It is useful to implement the method of the present invention in a vehicle combination for the roll regulation of the tractor vehicle and trailer or semitrailer. It is thus possible, for example, to prevent a rollover for the individual parts of a vehicle combination independently, which is useful in particular with respect to the rocking motion of truck trailers or mobile homes towed by passenger cars.

The invention builds on the device of the definition of the species in that one of the recorded actual values is characteristic of the roll state of the vehicle and one of the setpoint values is assigned to the recorded actual value that is characteristic of the roll state of the vehicle. In this manner, the roll state of the vehicle is also taken into consideration as part of a known vehicle dynamics control, thus making it possible to prevent a rollover of a vehicle even having a high center of gravity and a short wheelbase and under extreme driving maneuvers.

Preferably, one of the recorded actual values is the yaw rate and one of the setpoint values is assigned to the yaw rate. It is thus advantageously possible to combine the regulation of the roll state according to the present invention with the regulation of the yaw rate already known as part of the electronic stability program (ESP).

It is also useful if one of the actual values of the present invention is the float angle and if one of the setpoint values is assigned to the float angle. It is thus possible to combine the regulation of the roll state according to the present invention with the regulation of the float angle, the latter being known from the electronic stability program (ESP). It is advantageous in particular if the yaw rate regulation, float angle regulation and the regulation of the roll state are integrated in one system.

It is useful that means are provided for measuring the roll angle and that the roll angle is the actual value that is characteristic of the roll state of the vehicle. It is thus possible to measure the roll angle directly and to record the roll state of the vehicle in this manner.

It may also be advantageous that means are provided for measuring the pressure in an air spring of the vehicle and that a pressure change is the actual value that is characteristic of the roll state of the vehicle. Commercial vehicles in particular are frequently equipped with air springs so that it is advantageously possible to use the pressure change for recording the roll state.

It is advantageous in particular that means are provided for measuring the vehicle speed, that means are provided for measuring the steering angle and that setpoint values are determined from the input values of vehicle speed and steering angle. The input values of vehicle speed and steering angle are also already used in the known electronic stability program (ESP) so that it is also of particular advantage to use these values as input values in the context of the present invention to determine the setpoint value that is characteristic of the roll state of the vehicle.

Advantageously, means are provided for influencing the braking system and/or the engine, and actual values are influenced by braking interventions and/or engine interventions. This is also already known in the electronic stability program (ESP), for example, for the yaw rate. It is also possible to influence the actual value that is characteristic of the roll state of the vehicle in an advantageous manner by braking interventions and/or engine interventions.

It may also be useful that an actuator is provided and that the roll angle is influenced by an actuator. This influencing may occur in addition to or as an alternative to the influencing of the braking system and/or the engine so that numerous measures based on the present invention are available with respect to a rollover prevention.

It is of particular advantage that multiple roll regulation devices are provided for the tractor vehicle and for a trailer or a semitrailer in a vehicle combination. It is thus possible, for example, to prevent a rollover for the individual parts of a vehicle combination independently, which is useful in particular with respect to the rocking motion of truck trailers or mobile homes towed by passenger cars.

The invention is based on the knowledge that the additional regulation of the roll state of a vehicle within an already known electronic stability program makes it possible to achieve particularly high driving safety.

DRAWINGS

The invention will now be explained using preferred embodiments as examples with reference to the appended drawing in which.

DESCRIPTION OF THE EXEMPLARY EMBODIMENTS

Figure 1:
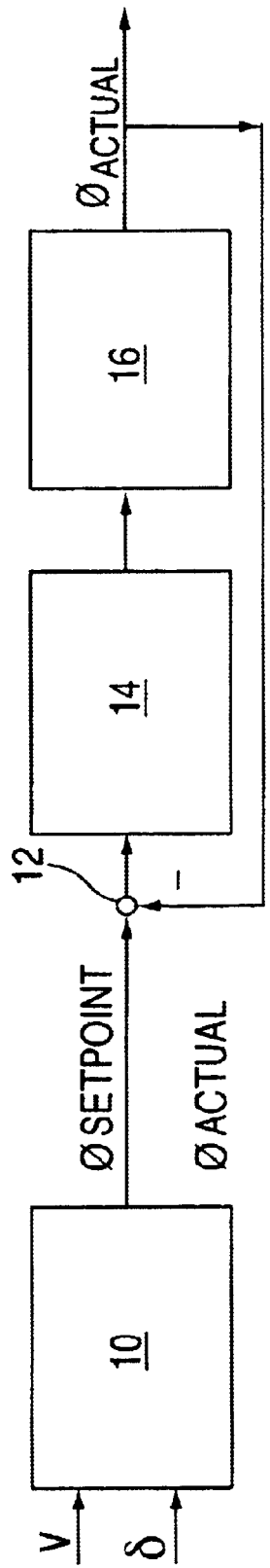
FIG. 1 shows a block diagram to explain a first embodiment of the invention.

A block diagram is shown in FIG. 1 to explain a first embodiment of the invention. The input values of vehicle speed v and steering angle δ are fed to means 10 for determining a setpoint value. These means 10 for determining a setpoint value are based on a reference model which, among other things, takes the roll angle of the vehicle into consideration. Details of the reference model are discussed further below. As its output value, the reference model has a setpoint roll angle $\phi_{setpoint}$. This setpoint roll angle $\phi_{setpoint}$ is one of the input values of a closed-loop control circuit. The other input value is $\phi_{actual}$. As a result of the comparison or subtraction of the values $\phi_{setpoint}$ and $\phi_{actual}$ in means 12, the comparison result is supplied to roll regulator 14. This roll regulator 14 delivers an output value to means 16 to influence the actual value. These means may, for example, exert an influence on the braking system, the engine or on a roll angle control. The output value of the closed-loop control circuit, which directly regulates roll angle φ in the present example, is then fed back to means 12 as $\phi_{actual}$ to compare actual values and setpoint values. This roll angle regulation described in simplified form using the present exemplary embodiment may accordingly be expanded to include the regulation of other values, for example, the yaw rate or the float angle. In order to take transient events into consideration, an expansion of the system may involve a $1^{st}$ or $2^{nd}$ order lowpass.

As mentioned above, the means for determining setpoint values make use of a reference model, which now advantageously takes the roll angle into consideration in addition to the float angle and the yaw rate. This reference model is based on the differential equation system shown below in Equation 1

$$\begin{bmatrix} m \cdot v, & 0, & m_s \cdot h \\ 0, & I_z, & -I_{xy} \\ m_s \cdot h \cdot v, & -I_{xy}, & I_x \end{bmatrix} . \tag{1}$$

$$\begin{bmatrix} \dot{\beta} \\ \ddot{\psi} \\ \ddot{\phi} \end{bmatrix} = \begin{bmatrix} Y_\beta, & Y_\psi - m \cdot v, & 0, & Y_\phi \\ N_\beta, & N_\psi, & 0, & N_\phi \\ 0, & m_s \cdot h \cdot v, & L_p, & L_\phi \end{bmatrix} \cdot \begin{bmatrix} \beta \\ \psi \\ \dot{\phi} \\ \phi \end{bmatrix} + \begin{bmatrix} Y_\delta \\ N_\delta \\ 0 \end{bmatrix} \cdot \delta$$

The following relations apply:

$Y_\beta = -C_f - C_r$ $Y_\psi = \dfrac{-a \cdot C_f + b \cdot C_r}{v}$ $Y_\delta = C_f$ $N_\beta = -a \cdot C_f + b \cdot C_r$ $N_\psi = \dfrac{-a^2 \cdot C_f + b^2 \cdot C_r}{v}$ $N_\delta = a \cdot C_f$ The symbols used in the equations have the following meaning:

$N_\phi$: roll-steer influence,
$L_\phi$: roll stiffness,
$L_\phi$: roll damping,
β: float angle,
ψ: yaw angle,
φ: roll angle,
δ: wheel steering angle,
a, b: distance from vehicle center of gravity to front axle or rear axle, h: height of center of gravity, m: vehicle mass (s: movable body mass relative to chassis)

I: mass moment of inertia (z: vertical axis, x: roll axis, xy: deviation torque), v: vehicle speed, c: lateral tire stiffness (f: front, r: rear).

The stationary solution of these equations delivers a reference model for the vehicle yaw rate and the degree of roll freedom:

$$\frac{\dot{\psi}}{\delta} = \frac{L_\phi \cdot (N_\beta \cdot Y_\delta - N_\delta \cdot Y_\beta)}{L_\phi \cdot (m \cdot v \cdot N_\beta - N_\beta \cdot Y_\psi + N_\psi \cdot Y_\beta) + m_s \cdot h \cdot v \cdot (N_\phi \cdot Y_\beta - N_\beta \cdot Y_\phi)} \quad (2)$$

$$\frac{\phi}{\delta} = \frac{m_s \cdot h \cdot v \cdot (N_\beta \cdot Y_\delta - N_\delta \cdot Y_\beta)}{L_\phi \cdot (m \cdot v \cdot N_\beta - N_\beta \cdot Y_\psi + N_\psi \cdot Y_\beta) + m_s \cdot h \cdot v \cdot (N_\phi \cdot Y_\beta - N_\beta \cdot Y_\phi)}$$

The setpoint yaw rate $$\dot{\psi} = f(\delta, vf)$$

is thus obtained as a function of the steering angle and the vehicle speed, vf being a speed value which describes the speed in longitudinal direction. In a comparable manner, a setpoint roll angle $$\phi = f(\delta, vf),$$

is obtained which is also a function of the steering angle and speed value vf.

If no explicit measurement of the roll angle is available, it is nonetheless possible to implement an indirect roll angle regulation through the measurement of other values that characterize a roll movement of the vehicle. However, this requires a corresponding adaptation of the reference model to the particular measured value used.

Figure 2:
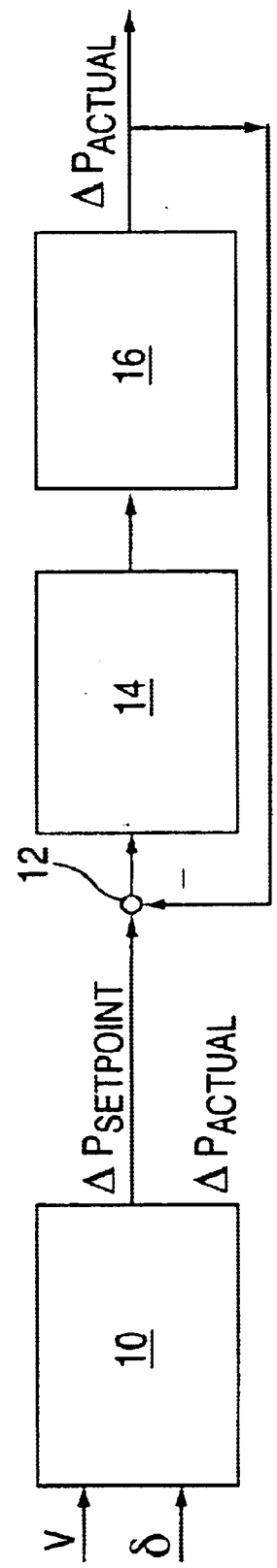
FIG. 2 shows a block diagram to explain a second embodiment of the invention.

FIG. 2 shows an example of indirect roll regulation. In means 10 for determining setpoint values, a modified reference model is used, which is explained in detail further below. In this case, a pressure change Δp is used as a controlled variable, pressure values measured in air springs of commercial vehicles, for example, being used. A modified reference model, which takes the pressure change dynamics into consideration, is used as a reference model. This is described in detail further below. The output signal of a subtraction 12 is supplied to roll regulator 14, the difference between a value $\Delta p_{setpoint}$, which is an output value of means 10, and a measured value $\Delta p_{actual}$, which is the output value of the closed-loop control circuit, being formed. The roll regulator outputs an output signal to means 16 to influence the actual values. In turn, these means may include the braking system, the engine control or special actuator technology to influence the roll angle.

The reference model is based on the following differential equation system:

$$\begin{bmatrix} m \cdot v, & 0, & m_s \cdot h, & 0 \\ 0, & I_z, & -I_{xy}, & 0 \\ m_s \cdot h \cdot v, & -I_{xy}, & I_x, & 0 \\ 0, & 0, & 0, & 1 \end{bmatrix} \cdot \begin{bmatrix} \dot{\beta} \\ \ddot{\psi} \\ \ddot{\phi} \\ \Delta \dot{p} \end{bmatrix} = \quad (3)$$

-continued $$\begin{bmatrix} Y_\beta, & Y_\psi - m \cdot v, & 0, & Y_\phi, & 0 \\ N_\beta, & N_\psi, & 0, & N_\phi, & 0 \\ 0, & m_s \cdot h \cdot v, & L_p, & L_\phi, & \tilde{A}_k \\ 0, & 0, & Q_{\dot{\phi}}, & Q_\phi, & Q_{\Delta p} \end{bmatrix} \cdot \begin{bmatrix} \beta \\ \dot{\psi} \\ \dot{\phi} \\ \phi \\ \Delta p \end{bmatrix} \cdot \begin{bmatrix} Y_\delta \\ N_\delta \\ 0 \\ 0 \end{bmatrix} \cdot \delta$$

This differential equation system has the stationary solution:

$$\frac{\dot{\psi}}{\delta} = \frac{L_\phi \cdot (N_\beta \cdot Y_\delta - N_\delta \cdot Y_\beta)}{L_\phi \cdot (m \cdot v \cdot N_\beta - N_\beta \cdot Y_\psi + N_\psi \cdot Y_\beta) + m_s \cdot h \cdot v \cdot (N_\phi \cdot Y_\beta - N_\beta \cdot Y_\phi)} \quad (4)$$

$$\frac{\phi}{\delta} = \frac{m_s \cdot h \cdot v \cdot (N_\beta \cdot Y_\delta - N_\delta \cdot Y_\beta)}{L_\phi \cdot (m \cdot v \cdot N_\beta - N_\beta \cdot Y_\psi + N_\psi \cdot Y_\beta) + m_s \cdot h \cdot v \cdot (N_\phi \cdot Y_\beta - N_\beta \cdot Y_\phi)}$$

$$\frac{\Delta p}{\delta} = \frac{-\tilde{A}_k \cdot m_s \cdot h \cdot v \cdot (N_\beta \cdot Y_\delta - N_\delta \cdot Y_\beta)}{\tilde{Q}_p \cdot (L_\phi \cdot (m \cdot v \cdot N_\beta - N_\beta \cdot Y_\psi + N_\psi \cdot Y_\beta) + m_s \cdot h \cdot v \cdot (N_\phi \cdot Y_\beta - N_\beta \cdot Y_\phi))}$$

The values Q, $\tilde{Q}$, $\tilde{A}$ are linearization coefficients, which relate to pneumatic values such as flow coefficients and piston cross section. These linearization coefficients are used for a linearized approximation in solving the largely non-linear differential equations relating to the pressure change dynamics in an air spring.

Thus a setpoint pressure change $\Delta p = f(\delta, vf)$ is specified as a function of the steering angle and of the value vf, which characterizes the speed in the longitudinal direction. Accordingly, it is possible to set up a pressure regulation, which acts indirectly on the degree of roll freedom.

The above description of the exemplary embodiments according to the present invention is only intended to illustrate and not to limit the invention. Various changes and modifications are possible within the context of the invention without departing from the scope of the invention and its equivalents.

What is claimed is:

1. A method of stabilizing a vehicle, comprising:
   recording characteristic actual values that correspond to a driving condition of the vehicle;
   determining setpoint values that are at least partially assigned to the characteristic actual values;
   comparing the characteristic actual values and the setpoint values; and
   influencing the characteristic actual values based on comparison results;
   wherein one of the characteristic actual values is characteristic of a roll state of the vehicle and one of the setpoint values is assigned to one of the characteristic actual values that is characteristic of the roll state of the vehicle, and wherein a pressure change in an air spring of the vehicle is one of the characteristic actual values that is characteristic of the roll state of the vehicle.

2. The method of claim 1, wherein one of the characteristic actual values is a float angle and one of the setpoint values is assigned to the float angle.

3. The method of claim 1, wherein setpoint values are determined from input values of a vehicle speed and a steering angle.

4. The method of claim 1, wherein the characteristic actual values are influenced by at least one of a braking intervention and an engine intervention.

5. The method of claim 1, wherein the method is implemented in a vehicle combination for roll regulating a tractor vehicle and one of a trailer and a semitrailer.

6. A device for stabilizing a vehicle, comprising:
- a first arrangement to record characteristic actual values that correspond to a driving condition of the vehicle;
- a second arrangement to determine setpoint values that are at least partially assigned to the characteristic actual values;
- a third arrangement to compare the characteristic actual values and the setpoint values;
- a fourth arrangement to influence the characteristic actual values based on comparison results; and
- a fifth arrangement to measure a pressure in an air spring of the vehicle;
- wherein one of the characteristic actual values is characteristic of a roll state of the vehicle, and one of the setpoint values is assigned to one of the characteristic actual values that is characteristic of the roll state of the vehicle, and wherein a pressure change in the air spring is one of the characteristic actual values that is characteristic of the roll state of the vehicle.

7. The device of claim 6, wherein one of the characteristic actual values is a yaw rate and one of the setpoint values is assigned to the yaw rate.

8. The device of claim 6, wherein one of the characteristic actual values is a float angle and one of the setpoint values is assigned to the float angle.

9. The device of claim 6, further comprising:
- an arrangement to measure a roll angle and the roll angle is one of the characteristic actual values that is characteristic of the roll state of the vehicle.

10. The device of claim 6, further comprising:
- an arrangement to measure a vehicle speed; and
- an arrangement to measure a steering angle;
- wherein the setpoint values are determined from input values of the vehicle speed and the steering angle.

11. The device of claim 6, further comprising:
- an arrangement to influence at least one of a braking system and an engine;
- wherein the characteristic actual values are influenced by at least one of a braking intervention and an engine intervention.

12. The device of claim 6, further comprising:
- an actuator, wherein a roll angle is influenced by the actuator.

13. The device of claim 6, further comprising:
- roll regulation devices configured for a tractor vehicle and one of a trailer and a semitrailer in a vehicle combination.

14. A method of stabilizing a vehicle, comprising:
- recording characteristic actual values that correspond to a driving condition of a vehicle;
- determining setpoint values that are at least partially assigned to the characteristic actual values;
- comparing the characteristic actual values and the setpoint values; and
- influencing the characteristic actual values based on comparison results;
- wherein one of the characteristic actual values is characteristic of a roll state of the vehicle, and one of the setpoint values is assigned to one of the characteristic actual values that is characteristic of the roll state of the vehicle, and wherein a pressure change in an air spring of the vehicle is one of the characteristic actual values that is characteristic of the roll state of the vehicle, and wherein one of the characteristic actual values is a yaw rate and one of the setpoint values is assigned to the yaw rate.

* * * * *

UNITED STATES PATENT AND TRADEMARK OFFICE
CERTIFICATE OF CORRECTION

PATENT NO. : 6,873,897 B2
DATED : March 29, 2005
INVENTOR(S) : Ian Faye et al.

It is certified that error appears in the above-identified patent and that said Letters Patent is hereby corrected as shown below:

<u>Title page,</u>
Item [57], ABSTRACT,
Line 1, change "a vehicle involving" to -- a vehicle and a device for --.
Lines 1-2, delete "the following steps is described".
Line 5, change "and setpoint values" to -- and setpoint values; --.
Lines 10-11, delete "A device ... is also described.".

<u>Column 1,</u>
Line 3, insert heading -- FIELD OF THE INVENTION --.
Line 11, change "a vehicle having means" to -- a vehicle including an arrangement --.
Line 13, change "means for determining" to -- an arrangement for determining --.
Line 14, change "means for" to -- an arrangement for --.
Line 15, change "and means for" to -- and an arrangement for --.
Lines 20-21, delete "according to the definition of the species".
Line 21, change "in systems intended to" to -- in other systems intend to --.
Lines 34-35, change "drasti- cally reduces the danger" to -- may drastically reduce the danger --.
Lines 35-36, change "and largely makes it possible to keep" to -- and may keep --.
Line 37, change "it is known to use" to -- other systems use --.
Line 40, change "makes it possible to largely eliminate" to -- may allow elimination of --.
Line 50, change "ADVANTAGES OF THE INVENTION" to -- SUMMARY OF THE INVENTION --.
Lines 52-53, change "The invention builds on the method of the definition of the species to" to -- The present invention may provide --.
Line 58, change "a known vehicle" to -- a vehicle --.
Lines 58-59, delete "making it possible to prevent".
Line 59, change "even having" to -- may be prevented even when the vehicle has --.
Line 60, change "under" to -- undergoes --.
Line 62, change "Preferably, one of" to -- One of --.
Line 62, change "is the yaw" to -- may be the yaw --.
Line 63, change "is assigned to" to -- may be assigned to --.
Line 64, change "It is thus advantageously possible to combine the" to -- The --.
Line 65, change "the present invention" to -- the present invention may be combined --.

<u>Column 2,</u>
Line 1, change "It is also advantageous if one" to -- One --.
Line 2, change "is the float angle and if one" to -- may be the float angle and one --.
Line 2, change "is assigned" to -- may be assigned --.
Line 3, change "It is thus possible to combine the" to -- The --.
Line 4, change "the present invention with" to -- the present invention may be combined with --.

UNITED STATES PATENT AND TRADEMARK OFFICE
CERTIFICATE OF CORRECTION

PATENT NO. : 6,873,897 B2
DATED : March 29, 2005
INVENTOR(S) : Ian Faye et al.

It is certified that error appears in the above-identified patent and that said Letters Patent is hereby corrected as shown below:

Column 2 (cont'd),
Lines 6-7, change "It is advantageous in particular if the" to -- The --.
Line 8, change "are integrated" to -- may be integrated --.
Line 10, change "It is advantageous that the" to -- The --.
Line 10, change "angle is" to -- angle may be --.
Lines 11-12, change "It is thus possible to measure the" to -- The --.
Line 12, change "roll angle directly" to -- roll angle may be measured directly --.
Line 13, change "vehicle in this manner" to -- vehicle may be recorded in this manner --.
Line 14, delete "it may also be useful if".
Line 15, change "is the value" to -- may be the value --.
Lines 16-17 change "in particular are frequently equipped" to -- may be equipped --.
Lines 18-19, change "so that it is advantageously possible to use" to -- to allow use of --.
Line 20, change "Preferably, setpoint values are determined" to -- Setpoint values may be determined --.
Line 23, delete "known".
Lines 23-24, change "so that it is also of particular advantage to use these values" to -- so that these values may be used --.
Line 28, change "Preferably, actual values are influenced" to -- Actual values may be influenced --.
Line 31, change "It is also possible to influence the" to -- The --.
Line 33, delete "in an advantageous manner".
Line 33, change "by braking interventions" to -- may be influenced by braking interventions --.
Line 35, change "Preferably, the roll angle is influenced" to -- The roll angle may be influenced --.
Line 40, change "It is useful to implement the" to -- The --.
Line 41, change "invention" to -- invention may be implemented --.
Lines 42-43, change "It is thus possible, for example, to prevent a rollover" to -- Thus, for example, a rollover may be prevented --.
Lines 44-45, change "which is useful in particular" to -- which may be utilized --.
Lines 47-48, change "The invention builds on the device of the definition of the species in that" to -- The present invention may provide that --.
Line 54, delete "known".
Lines 54-55, delete "making it possible to prevent".
Line 55, change "even having" to -- may be prevented even when the vehicle has --.
Line 56, change "and under extreme" to -- and undergoes extreme --.
Line 58, change "Preferably, one of" to -- One of --.
Line 58, change "is the yaw" to -- may be the yaw --.
Line 59, change "is assigned" to -- may be assigned --.
Line 60, change "It is thus advantageously possible to combine the" to -- The --.

UNITED STATES PATENT AND TRADEMARK OFFICE
CERTIFICATE OF CORRECTION

PATENT NO. : 6,873,897 B2
DATED : March 29, 2005
INVENTOR(S) : Ian Faye et al.

It is certified that error appears in the above-identified patent and that said Letters Patent is hereby corrected as shown below:

Column 2 (cont'd),
Line 62, change "with the regulation" to -- may be combined with the regulation --.
Line 64, change "It is also useful if one" to -- One --.
Line 65, change "is the float angle" to -- may be the float angle --.
Line 66, change "is assigned" to -- may be assigned --.
Line 66, delete "It is thus possible to combine".
Line 67, change "the regulation" to -- The regulation --.

Column 3,
Line 1, change "invention" to -- invention may be combined --.
Lines 2-3, change "It is advantageous in particular if the" to -- The --.
Line 4, change "roll state are" to -- roll state may be --.
Line 6, change "It is useful that means are provided" to -- An arrangement may be provided --.
Line 8, change "It is this" to -- Thus, --.
Line 9, delete "possible to measure".
Line 9, change "the roll angle" to -- the roll angle may be measured --.
Line 9, delete "to record".
Line 10, change "vehicle in this manner." to -- vehicle may be recorded in this manner. --.
Line 11, change "It may also be advantageous that means are provided" to
-- An arrangement may be provided --.
Lines 14-15, change "vehicles in particular are frequently equipped" to -- vehicles may be equipped --.
Lines 15-16, delete "so that it is advantageously possible".
Line 18, change "It is advantageous in particular that means are provided" to
-- An arrangement may be provided --.
Line 19, change "that means are provided" to -- an arrangement may be provided --.
Line 20, change "and that setpoint values are" to -- and setpoint values may be --.
Line 23, change "the known electronic" to -- the electronic --.
Lines 24-25, delete "it is also of particular advantage to use".
Line 25, change "these values" to -- these values may be used --.
Line 28, change "Advantageously means are provided" to -- An arrangement may be provided --.
Lines 32-33, change "It is also possible to influence the" to -- The --.
Line 34, change "in an advantageous manner" to -- may be influenced --.
Line 36, change "It may also be useful that an activator is provided and that" to
-- An activator may be provided and --.
Line 37, change "angle is influenced" to -- angle may be influenced --.
Line 42, change "It is of particular advantage that multiple" to -- Multiple --.
Line 43, change "are provided" to -- may be provided --.

UNITED STATES PATENT AND TRADEMARK OFFICE
CERTIFICATE OF CORRECTION

PATENT NO.    : 6,873,897 B2
DATED         : March 29, 2005
INVENTOR(S)   : Ian Faye et al.

It is certified that error appears in the above-identified patent and that said Letters Patent is hereby corrected as shown below:

Column 3 (cont'd),
Line 44, change "It is thus possible" to -- Thus, --.
Line 45, change "to prevent a rollover" to -- a rollover may be prevented --.
Lines 46-47, change "which is useful in particular" to -- which may be utilized --.
Line 50, change "The invention" to -- The present invention --.
Line 52, delete "already known".
Lines 52-53, change "makes it possible to achieve particularly" to -- of another system may allow --.
Line 55, change "DRAWINGS" to -- BRIEF DESCRIPTION OF THE DRAWINGS --.
Lines 56-59, delete "The invention . . . in which:".
Line 59, change "a first" to -- a first exemplary --.
Line 60, change "the invention and" to -- the present invention. --.
Line 61, change "a second" to -- a second exemplary --.
Line 62, change "the invention." to -- the present invention. --.
Lines 64-65, change "DESCRIPTION OF THE EXEMPLARY EMBODIMENTS" to -- DETAILED DESCRIPTION --.

Column 4,
Line 1, change "means 10" to -- arrangement 10 --.
Line 2, change "These means 10" to -- This arrangement 10 --.
Line 3, change "are based on" to -- is based on --.
Lines 5-6, change "are discussed further below." to -- are described below. --.
Line 10, change "in means 12," to -- in arrangement 12, --.
Line 12, change "to means 16" to -- to arrangement 16 --.
Line 13, change "These means may," to -- This arrangement may, --.
Line 17, change "to means 12" to -- to arrangement 12 --.
Line 25, change "the means for" to -- an arrangement for --.

Column 5,
Line 36, delete "it is nonetheless possible to implement".
Line 37, change "regulation" to -- regulation may be implemented --.
Line 40, delete "particular".
Line 42, change "means 10" to -- arrangement 10 --.
Line 43, change "which is explained in detail further" to -- which is described --.
Line 49, delete "in detail further".
Line 51, change "value of means" to -- value of arrangement --.
Line 54, change "to means 16" to -- to arrangement 16 --.
Line 55, change "these means may include" to -- this arrangement may include --.

UNITED STATES PATENT AND TRADEMARK OFFICE
CERTIFICATE OF CORRECTION

PATENT NO. : 6,873,897 B2
DATED : March 29, 2005
INVENTOR(S) : Ian Faye et al.

It is certified that error appears in the above-identified patent and that said Letters Patent is hereby corrected as shown below:

<u>Column 6,</u>
Line 35, change "it is possible to set up a pressure regulation," to -- a pressure regulation may be set up, --.
Line 39, change "the invention." to -- the present invention. --.
Line 40, change "modifications are possible" to -- modifications may be allowed --.
Lines 40-41, change "of the invention" to -- of the present invention --.
Line 41, change "scope of the invention" to -- scope of the present invention --.

Signed and Sealed this

Sixth Day of September, 2005

JON W. DUDAS
*Director of the United States Patent and Trademark Office*